United States Patent [19]

Fulton, Jr.

[11] 4,292,366
[45] Sep. 29, 1981

[54] MACHINE DEGRADABLE REINFORCED PAPER BARRIER MATERIAL

[76] Inventor: Cyrus B. Fulton, Jr., 108 Walter Davis Dr., Birmingham, Ala. 35209

[21] Appl. No.: 125,546

[22] Filed: Feb. 28, 1980

[51] Int. Cl.³ .................. B32B 5/10; B32B 29/00
[52] U.S. Cl. ............................. 428/293; 428/110; 428/112; 428/154; 428/294; 428/302; 428/486; 428/513
[58] Field of Search ............... 428/154, 110, 105, 513, 428/112, 239, 485, 295, 535, 191, 348, 349, 222, 302, 114, 292, 293, 294; 162/123, 104, 108, 124, 127, 132, 129; 156/179; 493/480

[56] References Cited

U.S. PATENT DOCUMENTS

| | | | |
|---|---|---|---|
| 1,796,675 | 3/1931 | Upson et al. | 428/191 |
| 2,158,755 | 5/1939 | Hodgdon et al. | 428/191 |
| 2,739,092 | 3/1956 | Stevenson | 156/179 |
| 2,902,395 | 9/1959 | Hirschy et al. | 428/255 |
| 3,231,462 | 1/1966 | Oswald et al. | 428/486 |
| 4,120,916 | 10/1978 | Meyer, Jr. et al. | 428/486 |
| 4,199,636 | 4/1980 | Clark | 428/166 |

Primary Examiner—Paul J. Thibodeau
Attorney, Agent, or Firm—Woodford R. Thompson, Jr.

[57] ABSTRACT

A machine degradable reinforced paper barrier material embodies at least two laminar sheets of paper in face-to-face relationship with a plurality of reinforcing strands of repulpable paper therebetween. The sheets are secured to each other and to the reinforcing strands by an adherer.

2 Claims, 4 Drawing Figures

MACHINE DEGRADABLE REINFORCED PAPER BARRIER MATERIAL

BACKGROUND OF THE INVENTION

This invention relates to a machine degradable reinforced paper barrier material and more particularly to a barrier material which may be wrapped around bales of material, such as mineral wool and the like, which require more strength than that provided by non-reinforced paper.

Heretofore in the art to which may invention relates, paper barrier material has usually been made by reinforcing sheets of paper with fibers of glass, rayon, nylon, jute and the like. Difficulties have been encountered in using such reinforcing fibers due to the fact that such fibers are not machine degradable since they are contaminated with materials that are not repulpable. Accordingly, such prior art barrier materials cannot be repulped to form other paper materials therefrom.

SUMMARY OF THE INVENTION

In accordance with my invention, I overcome the above and other difficulties by providing a machine degradable reinforced paper barrier material which consists of at least two laminar sheets of paper mounted in face-to-face relationship to each other with a plurality of reinforcing strands of repulpable paper therebetween. The sheets are secured to each other and to the reinforcing strands by an adherer, such as an adhesive. Accordingly, I provide a barrier material which is not only machine degradable in that it can be repulped, but also provide a barrier material which is bio-degradable.

DESCRIPTION OF THE DRAWING

A paper barrier material embodying features of my invention is illustrated in the accompanying drawing, forming a part of this application, in which.

DETAILED DESCRIPTION

Figure 2:
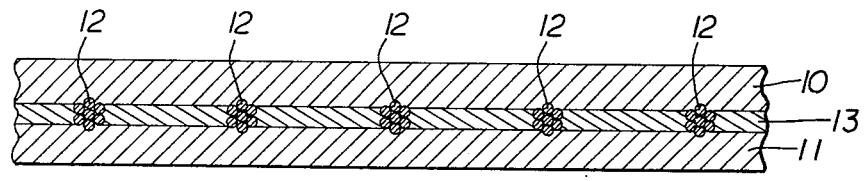
FIG. 2 is an enlarged, sectional view taken generally along the line 2—2 of FIG. 1.
Figure 1:
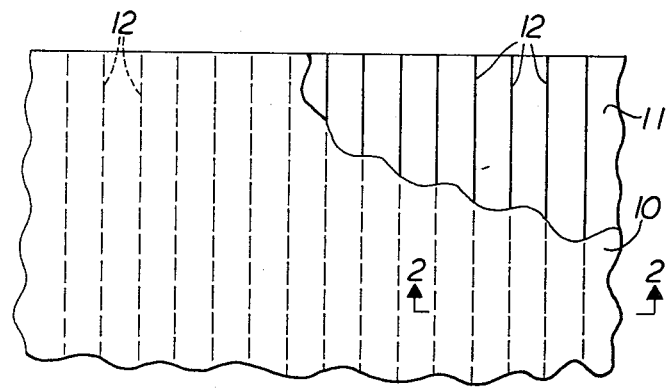
FIG. 1 is a fragmental, plan view, partly broken away, showing one embodiment of my improved paper barrier material.

Referring now to the drawing for a better understanding of my invention, I show in FIGS. 1 and 2 one form of my invention wherein the paper barrier material comprises laminar sheets 10 and 11 of paper which are mounted in face-to-face relationship to each other, as clearly shown in FIG. 2. A plurality of reinforcing strands 12 formed of repulpable paper are interposed between the sheets 10 and 11. Preferably, the reinforcing strands of paper are twisted to add strength thereto.

The sheets 10 and 11 are secured to each other and to the strands 12 by suitable means, such as an amorphous adhesive 13. The adhesive 13 may be in the form of amorphous polypropylene, wax or the like. In view of the fact that such adhesives are well known in the art to which my invention relates, no further description thereof is deemed necessary.

As shown in FIGS. 1 and 2, the strands 12 of repulpable paper may extend in parallel, spaced relation to each other throughout the width and length of the laminar sheets 10 and 11.

Figure 3:
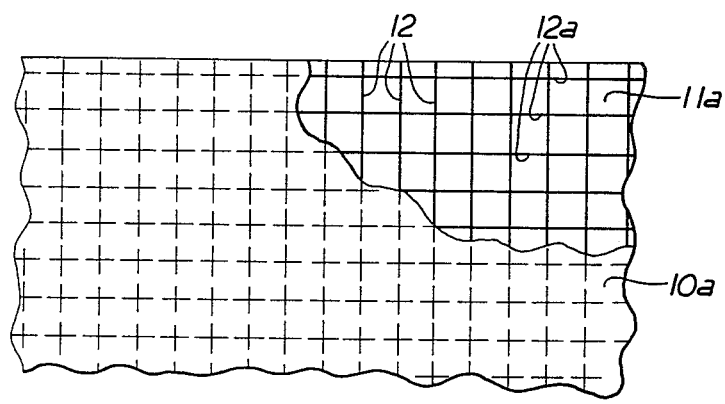
FIG. 3 is a fragmental, plan view, partly broken away, showing another embodiment of my invention.

Referring now to FIG. 3 of the drawing, I show a modification of my invention in which laminar sheets $10^a$ and $11^a$ of paper are mounted in face-to-face relationship to each other. A plurality of groups of strands 12 and $12^a$ are interposed between the sheets $10^a$ and $11^a$ in crossed relationship to each other. In FIG. 3, the strands 12 extend in parallel, spaced relation to each other, as described above relative to the embodiment shown in FIGS. 1 and 2 while the strands $12^a$ extend generally perpendicular to the strands 12. Accordingly, added strength is provided by the crossed, reinforcing strands of repulpable paper. The sheets $10^a$ and $11^a$ are secured to each other and to the reinforcing strands of repulpable paper 12 and $12^a$ by a suitable adherer such as an amorphous adhesive as described above.

Figure 4:
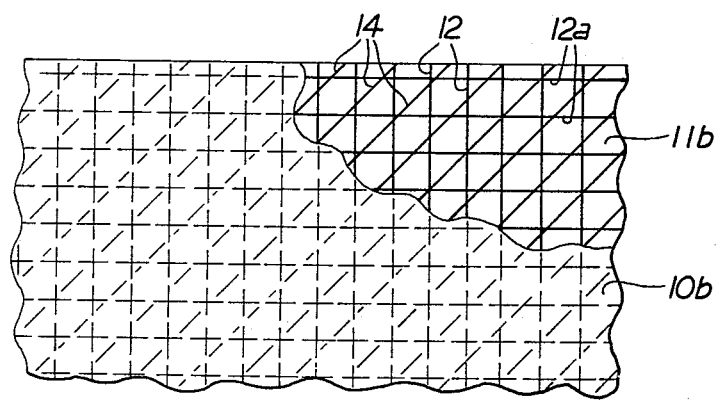
FIG. 4 is a fragmental, plan view, partly broken away, showing a still further modified form of my invention.

In FIG. 4 of the drawing, I show a further modification of my invention wherein laminar sheets of paper $10^b$ and $11^b$ are mounted in face-to-face relationship to each other. A group of strands 12 are positioned between the sheets of paper $10^b$ and $11^b$ in parallel, spaced relation to each other while a second group of strands $12^a$ are interposed between the sheets $10^b$ and $11^b$ in position to extend perpendicular to the group of strands 12, as shown. A third group of strands 14 are interposed between the sheets of paper $10^b$ and $11^b$ in position to extend diagonally relative to the other strands 12 and $12^a$, as shown. It will thus be seen that the reinforcing strands of repulpable paper may extend in generally parallel relation to each other, in crossed relationship to each other or with certain strands extending diagonally relative to other strands. It will also be apparent that the reinforcing strands of repulpable paper may assume other positions relative to each other than the positions shown.

From the foregoing, it will be seen that I have devised an improved machine degradable, reinforced paper barrier material. By providing reinforcing strands which are formed of repulpable paper and then securing such reinforcing strands between laminar sheets of paper by means of an amorphous adhesive, the composite sheet of reinforced paper barrier material is degradable whereby it may be repulped to form other paper barrier material or other paper products. Also, by employing a plurality of reinforcing strands of repulpable paper rather than fibers of glass, rayon, nylon, jute and the like, my improved product is not contaminated with materials that are not repulpable. It will be understood that by the term "machine degradable", I contemplate a material which is repulpable.

While I have shown my invention in several forms, it will be obvious to those skilled in the art that it is not so limited, but is susceptible of various other changes and modifications without departing from the spirit thereof.

What I claim is:

1. A machine degradable reinforced paper barrier material comprising:
    (a) at least two laminar sheets of paper mounted in face-to-face relationship to each other,
    (b) a plurality of machine degradable and biodegradable reinforcing strands of repulpable twisted paper between said sheets, and
    (c) adhesive means between said sheets adhering said sheets to each other and to said reinforcing strands.
2. A machine degradable reinforced paper barrier material as defined in claim 1 in which said means adhering said sheets to each other and to said reinforcing strands is amorphous polypropylene.

* * * * *